United States Patent
Park et al.

(10) Patent No.: US 6,330,114 B1
(45) Date of Patent: Dec. 11, 2001

(54) COLOR MIXING APPARATUS FOR REFLECTIVE DISPLAYS FACILITATING DESIGN OF PROJECTION LENS

(75) Inventors: Joon-Chan Park, Seoul; Kwon-Euy Song, Suwon, both of (KR)

(73) Assignee: Samsung Electronics Co., Ltd., Kyungki-Do (KR)

(*) Notice: Subject to any disclaimer, the term of this patent is extended or adjusted under 35 U.S.C. 154(b) by 0 days.

(21) Appl. No.: 09/487,295

(22) Filed: Jan. 19, 2000

(30) Foreign Application Priority Data

Jan. 20, 1999 (KR) .................................................. 99-1708

(51) Int. Cl.⁷ .......................... G02B 27/14; G03B 21/00
(52) U.S. Cl. ............................ 359/636; 359/634; 353/33
(58) Field of Search ................................ 359/634, 636, 359/639, 640; 353/33, 37, 81

(56) References Cited

U.S. PATENT DOCUMENTS 5,420,655 * 5/1995 Shimizu .................................. 353/33
5,604,624 * 2/1997 Magarill ............................... 359/224
6,128,055 * 10/2000 Park ...................................... 349/77

FOREIGN PATENT DOCUMENTS 11-2780     1/1999  (JP) .
0227636-A * 8/2000  (JP) ............................. G03B/21/00

* cited by examiner

Primary Examiner—Georgia Epps
Assistant Examiner—David N. Spector
(74) Attorney, Agent, or Firm—Sughrue Mion, PLLC

(57) ABSTRACT

A color mixing apparatus for reflective displays facilitating design of a projection lens is provided, in which a prism angle of each TIR prism is designed to have the magnitude of 37° through 38°, and an incident angle with respect to each color light is adjusted into the magnitude of 39° through 40°, to thereby facilitate the design of the projection lens. The color mixing apparatus is used for designing a three-plate projection television using reflective display devices.

5 Claims, 1 Drawing Sheet

FIGURE
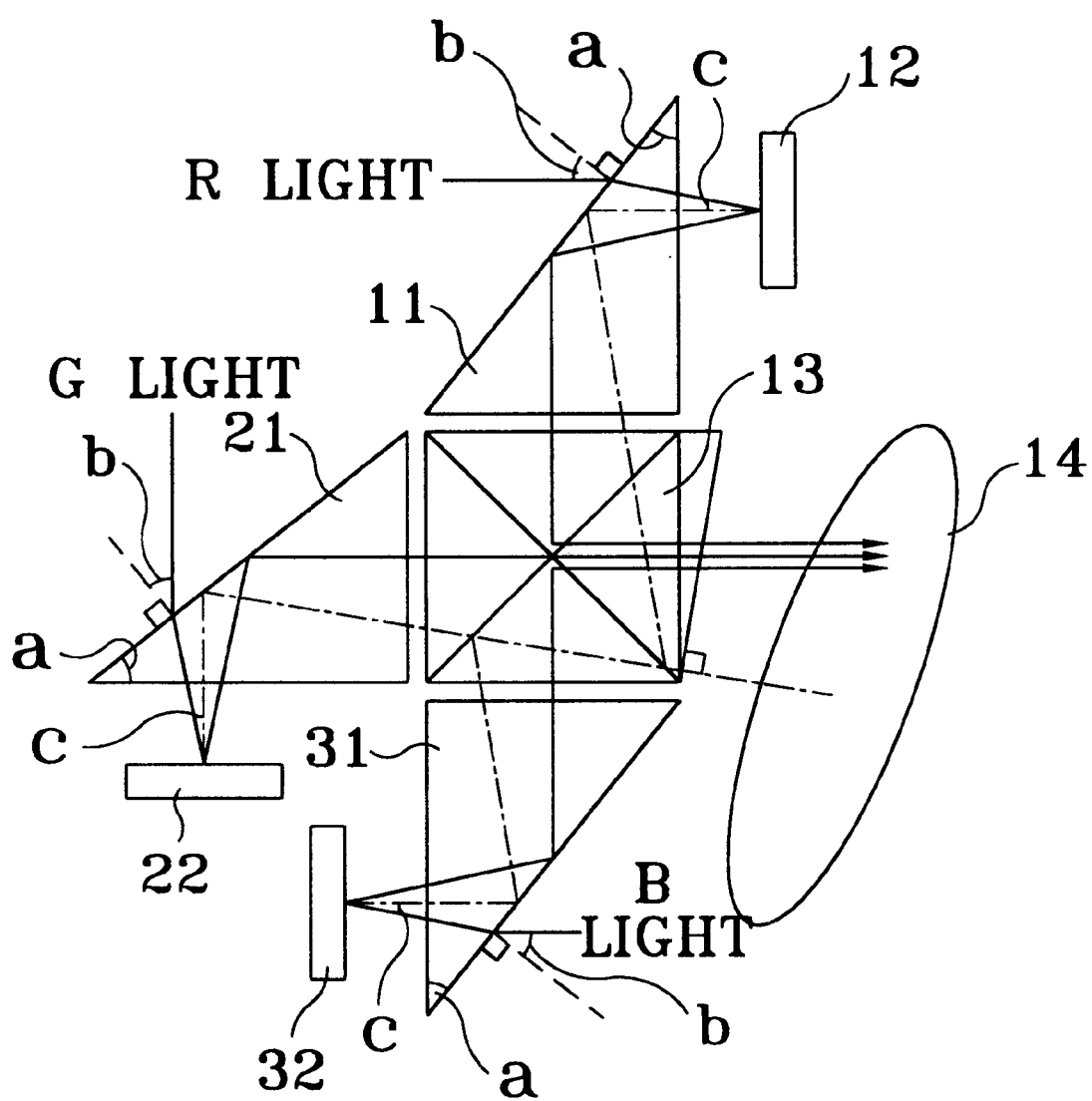

COLOR MIXING APPARATUS FOR REFLECTIVE DISPLAYS FACILITATING DESIGN OF PROJECTION LENS

BACKGROUND OF THE INVENTION

1. Field of the Invention

The present invention related to a color mixing apparatus for reflective displays using a total internal reflection (TIR) prism, and more particularly, to a color mixing apparatus for reflective displays in which the magnitude of prism angle in the TIR prism and the magnitude of an incident angle of each color light is adjusted to facilitate the design of a projection lens.

2. Description of the Related Art

A color mixing apparatus for reflective displays using a TIR prism mixes R, G and B color light using three TIR prisms, three reflective display devices and a color cube. The mixed color light is formed as an image on a screen via a projection lens. As the F number of the projection lens (focal distance/lens effective aperture) become larger, the projection lens can be more easily designed. That is, if the F number of the projection lens is large, the number of the lenses used for designing the projection lens is reduced, thereby making it easy to design a projection lens. Thus, in order to enlarge the F number of the projection lens, the magnitude of the off-axial angle should be reduced or a back focal length (BFL) should be shortened in a color mixing apparatus.

However, in the color mixing apparatus, if the magnitude of the off-axial angle becomes smaller, the BFL becomes longer, while if the BFL becomes shorter, the magnitude of the off-axial angle becomes greater. Thus, it is difficult to reduce both the magnitude of the off-axial angle and the BFL.

SUMMARY OF THE INVENTION

To solve the above problems, it is an object of the present invention to provide a color mixing apparatus for reflective displays in which the magnitude of a prism angle in the TIR prism and the magnitude of an incident angle of each color light are adjusted to facilitate the design of a projection lens.

To accomplish the above object of the present invention, there is provided a color mixing apparatus for reflective displays which forms an image on a screen, the color mixing apparatus comprising: reflective display devices for reflecting each of incident R, G and B color lights; total internal reflection (TIR) prisms for transmitting each of the incident R, G and B color lights so that the transmitted light proceeds to each of the reflective display devices and totally reflecting the R, G and B color light reflected from each of the reflective display devices; a color cube for mixing the R, G and B color light totally reflected from the TIR prisms; and a projection lens for transmitting the light mixed from the color cube and forming an image on a screen, wherein the magnitude of the prism angle is adjusted for each TIR prism and the magnitude of an incident angle of each color light incident to said each TIR is adjusted, thereby facilitating the design of said projection lens.

BRIEF DESCRIPTION OF THE DRAWING

The above object and other advantages of the present invention will become more apparent by describing the preferred embodiments thereof in more detail with reference to the accompanying drawing in which:

FIGURE shows a schematic configuration of a color mixing apparatus for reflective displays according to the present invention.

DETAILED DESCRIPTION OF THE INVENTION

A preferred embodiment of the present invention will be described with reference to the accompanying drawing.

FIGURE shows a schematic configuration of a color mixing apparatus for reflective displays according to the present invention.

In the figure, red (R) color light supplied from an illumination system (not shown) is incident to a first TIR prism 11 and refracted. Then, the refracted R light proceeds to a first reflective display device 12. The first reflective display device 12 reflects the incident light to then be directed to the first TIR prism 11. The reflected R light having proceeded to the first TIR prism 11 is totally reflected from the first TIR prism 11 to then proceed to a color cube 13. Meanwhile, green (G) color light supplied from an illumination system (not shown) is incident to a second TIR prism 21 and refracted. Then, the refracted G light proceeds to a second reflective display device 22. The second reflective display device 22 reflects the incident light to then be directed to the second TIR prism 21. The reflected G light having proceeded to the second TIR prism 21 is totally reflected from the second TIR prism 21 to then proceed to the color cube 13. Meanwhile, blue (B) color light supplied from an illumination system (not shown) is incident to a third TIR prism 31 and refracted. Then, the refracted B light proceeds to a third reflective display device 32. The third reflective display device 32 reflects the incident light to then be directed to the third TIR prism 31. The reflected B light having proceeded to the third TIR prism 31 is totally reflected from the third TIR prism 31 to then proceed to the color cube 13. The color cube 13 mixes the incident R, G and B color light. The light mixed in the color cube 13 is formed as an image on a screen (not shown) via a projection lens 14.

In the above color mixing apparatus, the incidence position of the R light incident from the illumination system (not shown) can be mutually exchanged with that of the B color incident from the illumination system (not shown).

In the drawing, a character "a" represents a prism angle of each of TIR prisms 11, 21 and 31, a character "b" represents an incident angle of each color light incident to each of the TIR prisms 11, 21 and 31, and a character "c" represents a off-axial angle which is constituted by the color light incident to each of the reflective display devices 12, 22 and 32 and the normal line perpendicular to the incident plane of each of the reflective display devices 12, 22 and 32. Also, in the drawing, the single-point-one-line from each of the reflective display devices 12, 22 and 32 to the center of the projection lens 14 represents a back focal length (BFL). The BFL with respect to each color light is identical.

The color mixing apparatus for reflective displays according to the present invention is designed with each of the TIR prisms 11, 21 and 31 so that a prism angle "a" has the magnitude of 37° through 38°. Also, in the color mixing apparatus according to the present invention, an incident angle "b" with respect to each color light is adjusted into the magnitude of 39° through 40°. By doing so, in the color mixing apparatus according to the present invention, both the magnitude of the off-axial angle "c" and the BFL have an appropriately small value, respectively. Thus, a projection lens can be easily designed. In this case, the magnitude of the off-axial angle "c" is approximately 19° and the BFL is 50 mm±5 mm.

As described above, in the color mixing apparatus for reflective displays using the TIR prisms according to the present invention, a prism angle of each TIR prism is designed to have the magnitude of 37° through 38°, and an incident angle with respect to each color light is adjusted into the magnitude of 39° through 40°, to thereby facilitate design of the projection lens. The above color mixing apparatus is used for designing a three-plate projection television using reflective display devices.

What is claimed is:

1. A color mixing apparatus for reflective displays which receives R, G, and B light and forms an image on a screen, the color mixing apparatus comprising:

an R reflective display device for receiving and reflecting R color light that is incident upon said R reflective display device;

a G reflective display device for receiving and reflecting G color light that is incident upon said G reflective display device;

a B reflective display device for receiving and reflecting B color light that is incident upon said B reflective display device;

at least three total internal reflection (TIR) prisms each being associated with one of said R, G, and B reflective display devices, said TIR prisms each having in input surface, an intermediate surface, and an output surface, said input surface being at an angle less than 90 degrees from said output surface, said TIR prisms each receiving inputted color light via said input surface, outputting said color light via said intermediate surfaces to said associated reflective device and receiving back reflected color light from said associated reflective device through said intermediate surface, and outputting color light through said output surface, an angle between said input surface and said intermediate surface being a prism angle, an angle between said inputted light and a normal to said input surface being an incident angle;

a color cube for receiving said R, G and B color lights from said respective output surfaces of said R, G, and B TIR prisms and mixing said R, G, and B color lights; and a projection lens for receiving said mixed light from said color cube and transmitting the mixed light to form an image on a screen, the magnitudes of said prism angles and said incident angles are determined in accordance with the design of said projection lens.

2. The color mixing apparatus for reflective displays of claim 1, wherein said TIR prisms have a prism angle of the magnitude of 37° through 38°.

3. The color mixing apparatus for reflective displays of claim 1, wherein said incident angles of said TIR prisms have a magnitude of 39° through 40°.

4. The color mixing apparatus for reflective displays of claim 1, wherein a back focal length of said reflective display devices is 50 mm±5 mm.

5. The color mixing apparatus for reflective displays of claim 1, wherein an off-axial angle of said reflective display devices between a normal to said reflective display devices and said color light that is outputted from said TIR intermediate surfaces to said reflective display devices, is approximately 19°.

* * * * *